United States Patent
Tsengas

(10) Patent No.: US 8,367,130 B1
(45) Date of Patent: Feb. 5, 2013

(54) EDIBLE PET TREAT PACKAGING

(75) Inventor: Steven Tsengas, Fairport Harbor, OH (US)

(73) Assignee: OurPet's Company, Fairport Harbor, OH (US)

(*) Notice: Subject to any disclaimer, the term of this patent is extended or adjusted under 35 U.S.C. 154(b) by 0 days.

(21) Appl. No.: 13/213,336

(22) Filed: Aug. 19, 2011

Related U.S. Application Data

(60) Provisional application No. 61/375,598, filed on Aug. 20, 2010.

(51) Int. Cl.
*A21D 13/00* (2006.01)

(52) U.S. Cl. .................. 426/138; 119/711

(58) Field of Classification Search .......... 119/709, 119/710, 711; 426/138
See application file for complete search history.

(56) References Cited

U.S. PATENT DOCUMENTS

| | | | |
|---|---|---|---|
| 848,136 A | 3/1907 | Smith et al. | |
| 1,022,112 A | 4/1912 | Smith et al. | |
| 1,149,170 A * | 8/1915 | Allis | 119/710 |
| 1,265,926 A | 5/1918 | Ludlam | |
| 1,302,174 A | 4/1919 | Kettle | |
| 2,062,489 A * | 12/1936 | Adams | 426/140 |
| 4,203,516 A * | 5/1980 | Stonoga et al. | 206/216 |
| 4,205,091 A * | 5/1980 | Van Horne | 426/138 |
| 5,339,771 A * | 8/1994 | Axelrod | 119/710 |
| 5,346,710 A * | 9/1994 | Geitner | 426/115 |
| D385,686 S * | 11/1997 | Parker | D1/122 |
| 5,797,353 A | 8/1998 | Leopold | |
| 5,897,893 A * | 4/1999 | Mohilef | 426/89 |
| 6,048,248 A | 4/2000 | Ritchey | |
| 6,237,538 B1 | 5/2001 | Tsengas | |
| 6,337,097 B1 * | 1/2002 | Sun et al. | 426/102 |
| 6,610,337 B1 * | 8/2003 | Janik et al. | 426/103 |
| 6,838,101 B2 * | 1/2005 | Hoy | 426/87 |
| 6,886,496 B1 * | 5/2005 | Brown | 119/710 |
| 6,899,059 B1 | 5/2005 | Crane et al. | |
| 7,082,894 B2 * | 8/2006 | Sherrill et al. | 119/709 |
| 7,246,574 B2 | 7/2007 | Renforth | |
| 7,976,884 B2 * | 7/2011 | Weinberg | 426/282 |
| 2004/0142073 A1 | 7/2004 | Buchannan | |
| 2008/0220144 A1 * | 9/2008 | Richards | 426/622 |
| 2009/0104314 A1 * | 4/2009 | Dellinger et al. | 426/72 |
| 2009/0151649 A1 * | 6/2009 | Vardy et al. | 119/710 |
| 2009/0235872 A1 * | 9/2009 | Filipi et al. | 119/710 |
| 2009/0252840 A1 * | 10/2009 | Thorn | 426/138 |
| 2009/0266306 A1 | 10/2009 | Edwards et al. | |
| 2010/0034930 A1 * | 2/2010 | Ko | 426/90 |

* cited by examiner

*Primary Examiner* — Rob Swiatek
*Assistant Examiner* — Ebony Evans
(74) *Attorney, Agent, or Firm* — John D. Gugliotta, P.E. Esq.; Nicholas A. Mihalic, Esq.; Howard L. Wernow

(57) ABSTRACT

A pet treat is manufactured of mostly or entirely of a compressed food material or similar substance. The treat has a semi-rigid or flexible outer shell, skin, film or membrane formed of an edible paper products such as a food paper or rice paper of a type capable of being made from white rice flour, tapioca flour, salt, and water, or from a planar sheet of edible material made from, for example, ground yellow corn, or, with any material, may be used separately or together with poultry by-products, fish meal, catnip or fish oil. Catnip, alfalfa, or any other olfactory or gustative attractive material may be provided in a liquid or flake form, and may be applied integrally in the manufacture of the edible sheet, or included in a central core that is encased by the outer sheets. A method and means of packaging is also provided.

9 Claims, 6 Drawing Sheets

EDIBLE PET TREAT PACKAGING

RELATED APPLICATIONS AND DISCLOSURES

The present invention claim benefit of U.S. Provisional Patent Application No. 61/375,598, filed on Aug. 20, 2010 and incorporated by reference as if fully rewritten herein.

BACKGROUND OF THE INVENTION

1. Field of the Invention

The present invention relates generally to a consumable type pet treats such as those delivering catnip, or similar food products, and, more particularly, to a method and means of packaging and delivering such pet food and attracts the pet via the olfactory and gustative senses.

2. Description of the Related Art

Nepeta cataria, commonly known as "catnip", is a perennial herb of the mint family that is mostly used as a feline attractant and recreational substance for feline enjoyment. Catnip is known to cause a positive effect on most cats, such as causing the cat to rub it, roll over it, kick at it, and generally be playfully and restfully affected for a period of time. And, while a cat will lose interest after a certain period of exposure, when reintroduced later the cat will likely have similar repeated responses. The plant terpenoid nepetalactone is the main chemical constituent of the essential oil of Nepeta cataria, and is thought to enter through the feline's nose or digestive system to produce a semi-hallucinogenic effect.

With such positive experiential use, catnip has been widely included in products having an intended use for recreational interaction with cats. For example, U.S. Pat. No. 848,136 and U.S. Pat. No. 1,022,112, both issued in the name of Smith et al, disclose a ball toy housing catnip and having perforations through which the cat can smell the catnip and cause recreational interaction. U.S. Pat. No. 1,302,174, issued in the name of Kettle, discloses a perforated 'shaker' type container for containing and dosing catnip for a similar purpose. U.S. Pat. No. 1,265,926, issued in the name of Ludlam, discloses a mouse-shaped toy containing catnip fill. Even more recently, the incorporation of catnip into a molded component or housing, such as shown in U.S. Pat. No. 5,797,353 issued in the name of Leopold has been used. And, the distributions of plush toys, similar to Ludlam, but having a refillable plush housing are shown in U.S. Pat. No. 6,899,059 issued in the name of Reich and U.S. Pat. No. 6,048,248 issued in the name of Ritchey. Also known is the use of refillable rigid housing toys, such as shown in U.S. Pat. No. 6,899,059 to Crane et al. and U.S. Pat. No. 7,246,574 to Renforth, as well as U.S. Pat. No. 6,237,538 issued to the present inventor.

Of particular note, U.S. Published Patent Application No. 2004/0142073, in the name of Buchannan, discloses an edible pet toy used for introducing a nutrient, treatment, and/or supplement component that benefits the health of the pet. The toy is manufactured entirely from a compressed substance or with a shell and at least one inner material. The toy can be either totally edible or includes a shell that is inedible yet expels one or more inner materials while the pet compresses the toy in its mouth.

Also of particular interest is U.S. Published Patent Application No. 2009/0266306 in the name of Edwards et al., in which a dual-purpose packaging is provided, which includes a process for extending the utility of the packaging as a pet-related product. This process includes the steps of filling a flexible, non-toxic and bite-resistant enclosure with a pet-related product. The pet-related product is then selectively dispensed from the enclosure for use in association with the pet. The utility of the packaging is thereafter extended by utilizing the enclosure as a pet chew toy.

However, the methods and apparatuses disclosed in the prior art in general, and Buchannan and Edwards et al. in particular, suffers from several drawbacks. Unlike any of the prior art, the use of edible paper (made primarily of rice and starch but can be made out of other grain products) of the present invention is edible and easily digestible. The paper can be formulated with various ingredients (e.g. catnip powder or oil, salmon or tuna powder/flakes or oil, beef, chicken or bacon flakes or oil) to impart a unique, attractive taste or aroma depending on the pet species. In addition, other vitamins, minerals, etc. can be added for maintaining pet health and vitality.

Further, the present invention can be easily formed into various enclosed shapes (pillows, tubes, mice, bones, etc.) and filled with catnip, tuna flakes, salmon flakes, beef/chicken/bacon flakes or oil) depending on the pet species, or pressed into a shape and texture that will simulate a real prey (e.g. tearing into the prey and eating its contents and skin).

Further still, the edible paper treat packaging of the present invention minimizes soiling or messing the household area by the pet.

And finally, the edible paper treat packaging is safe and healthy. Unlike raw hides, synthetic dog bones, plastic toys, etc. the edible paper treats will not damage the teeth or get lodged in the throat causing choking since they easily melt in the presence of saliva or other moisture.

Consequently, a need has been felt for providing olfactory and gustative stimulation of a pet through the use of a consumable pet product having an edible, integrated containment or packaging.

SUMMARY OF THE INVENTION

It is therefore an object of the present invention to provide an improved consumable type pet treats such as those delivering catnip, fish oil or similar olfactory and gustative products.

It is another object of the present invention to provide such an improved consumable type pet treats having an integrated containment or packaging that is manufactured from edible materials.

It is yet another object of the present invention to provide a topical pet food product that alleviates the waste of plastic disposable packaging or plastic toy body housings.

Briefly described according to the preferred embodiment of the present invention, a pet treat is manufactured of mostly or entirely of a compressed food material or similar substance. The treat has a semi-rigid or flexible outer shell, skin, film or membrane formed of an edible paper products such as a food paper or rice paper of a type capable of being made from white rice flour, tapioca flour, salt, and water, or from a planar sheet of edible material made from, for example, ground yellow corn, or, with any material, may be used separately or together with poultry by-products, fish meal, catnip or fish oil. Catnip, alfalfa, or any other olfactory or gustative attractive material may be provided in a liquid or flake form, and may be applied integrally in the manufacture of the edible sheet, or included in a central core that is encased by said outer sheets. In an alternate embodiment, the treat can be manufactured in a manner which a compressed or layered "chip-like" member is formed without encapsulating a central core. A relatively thicker planar member encasing, incorporating or integrating olfactory, gustative, nutritional or preservative components are formed in a light, entirely edible, small and inexpensive form factor. A randomly contorted configuration is shown, anticipated as having the consistency and physical configuration similar to a potato chip, can be made, or an embodiment shaped or compressed to a regular shape to facilitate stacking or nesting together, thereby allowing for a more efficient volume configuration for packaging or distribution purposes.

It is an advantage of the present invention to provide a pet treat formed of or wrapped in an edible paper (made primarily of rice and starch but can be made out of other grain products) that is fully edible and easily digestible.

It is another advantage of the present invention to use a paper that can be formulated with various ingredients (e.g. catnip powder or oil, salmon or tuna powder/flakes or oil, beef, chicken or bacon flakes or oil) to impart a unique, attractive taste or aroma depending on the pet species.

It is yet another advantage of the present invention to provide a unique means for adding other vitamins, minerals, etc. for maintaining pet health and vitality.

It is yet another advantage to provide an edible pet treat and pet treat packaging that can be easily formed into various enclosed shapes (pillows, tubes, mice, bones, etc.) and filled with catnip, tuna flakes, salmon flakes, beef/chicken/bacon flakes or oil) depending on the pet species, or pressed into a shape and texture that will simulate a real prey (e.g. tearing into the prey and eating its contents and skin).

It is yet a further advantage of the present invention to provide an edible paper treat packaging capable of minimizing soiling or messing of the household area by the pet.

It is an additional advantage of the present invention to provide a topical pet food product that requires no refrigeration and has an extendable shelf-life.

It is a final advantage of the present invention to deliver catnip, or similar food products via an edible paper treat that is capable of melting easily in the presence of saliva or other moisture, thereby not allowing damage to the pet's teeth nor causing choking through lodging in the mouth or throat.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
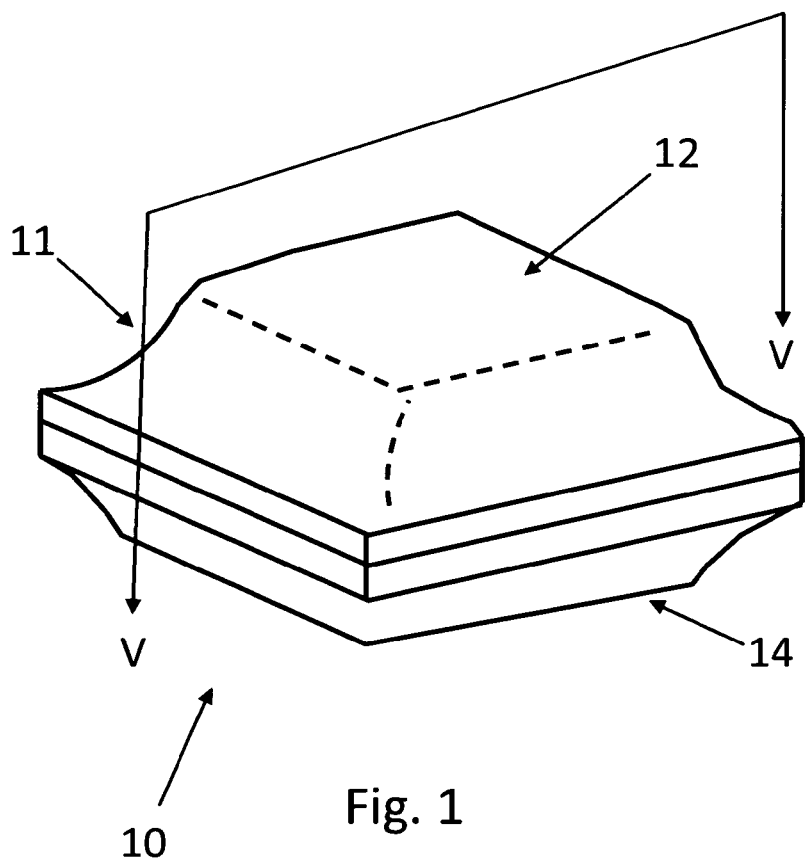
FIG. 1 is a perspective view of a consumable type pet treat having an edible packaging according to the preferred embodiment of the present invention.

The best mode for carrying out the invention is presented in terms of its preferred embodiment, herein described below and where appropriate depicted within the FIGS. 1 through 2, in which a pet treat is provided, generally noted as 10, according to the preferred embodiment of the present invention that not only provides olfactory and gustative stimulation of a pet entertainment for the pet, but can also be used to introduce a means of nourishment.

The treat 10 has a flexible outer shell 11, skin, film, or membrane formed of an upper sheet 12 and a lower sheet 14. However, as will become apparent through and in light of the subsequent description, a person having ordinary skill in the relevant art should come to understand that the use of a single sheet of film or membrane, folded along one or more edges, can provide the equivalent features and functions. The upper and lower sheets 12, 14 are anticipated as being formed of an edible paper product, such as a food paper or rice paper of a type capable of being made from white rice flour, tapioca flour, salt, and water, or from a planar sheet of edible material made from, for example, ground yellow corn, or, with any material, and may be used separately or together with poultry by-products, fish meal, catnip or fish oil. Catnip, alfalfa, or any other olfactory or gustative attractive material may be provided in a liquid or flake form, and may be applied integral in the manufacture of the edible shell 11, or included in a central core 16 that is encased by said upper and lower sheets 12, 14. It is further envisioned that at least one of an edible nodule 18 and a string 20 can be affixed to the upper and lower sheets 12, 14. The upper and lower sheets 12, 14 can consist of some essential oils (or edible product such as a food grade gelatin) to aid in the bonding/glazing process such that the shell 11 is relatively durable to resist manufacturing and handling processes and pet owner handling prior to exposure to the pet.

In accordance with the present invention of providing nutrients and treats therein, the treat 10 is manufactured of mostly or entirely of a compressed food material or similar substance. The upper and lower sheets 12, 14 will gradually wear away during play or be chewed away as the cat attempts to chew or lick the treat 10.

While the central core 16 is intended to incorporate catnip or similar treat, it is also anticipated that a nutritional component can be included from a wide variety of supplements that are available for pets. Insofar as the pet in this particular embodiment is a cat, the nutrient/supplement component can include, but is not limited to cosequin, glycoflex and other joint supplements, skin and coat supplements, vitamins and antioxidants, laxatives and hairball treatments, high energy supplements, nutraceuticals, digestion and elimination supplements, food supplements, pain supplements, milk replacers, weight loss supplements, and dentifrices. The consistency of selected vitamins or other nutrient/supplements as ingredients can also double as filler or binding material. Of course, the amount of supplement/nutrient can be controlled in the manufacturing process of the treat 10 according to the size, age, type, and particular ailment of the animal. Thus, a cat owner who has a cat with skin and coat problems and a weight loss problem, for example, can purchase the treat 10 manufactured with only those components, or those components plus a few others that address the ailments or needs of the pet, and do not provide the treatments that are not required.

The central core 16 can also include water soluble flavor extracts, natural ingredients (such as vitamins, minerals and other nutrients directed to improving pet health), artificial flavors, and either all or a selected number of preservative ingredients including rosemary extract (natural preservative), tocopherol (natural preservative) and sodium benzoate (artificial preservative). Water soluble flavorings are provided to enhance the taste and smell of the topical pet food product as applied to dry pet food, and include ingredients such as glycerin, salt, hydrolyzed vegetable and/or soy proteins, and water soluble vitamins such as the Vitamin B complex (thiamin, riboflavin, niacin, B6, folic acid, biotin, pantothenic acid and B12) and Vitamin C (ascorbic acid). Other natural ingredients, such as necessary minerals are provided and may include calcium, phosphorus, potassium, Iron, sodium, chloride, magnesium, iodine, copper, manganese, zinc and/or selenium to provide vitamin and/or mineral supplementation to the pet's diet.

Artificial flavors can also be incorporated, including flavorings to correspond to foods pets generally are attracted to, including fish, chicken, beef, turkey, pork, bacon, ham, bologna, sausage, cheese, chocolate, peanut butter, JELL-O™, gelatin, pudding, jelly, syrup, fruit and vegetables and other products. To provide such flavoring, ingredients such as enzymatically modified cheese, partially hydrogenated soy bean oil, bacon fat, fructose corn syrup and other related ingredients are incorporated into the production of the topical pet food product.

Preservatives may also be provided to sustain the consistency in taste and smell of the topical pet food product, and also to increase the shelf-life of the product once distributed. Natural and/or artificial preservatives may be provided in varying quantities and may include the inclusion of tocopherol (Vitamin E), a fat soluble vitamin well-known as an antioxidant that also acts as a natural preservative, rosemary or rosemary extract (also a natural preservative) and/or sodium benzoate, an artificial preservative. Rosemary and/or rosemary extracts are recognized for their antioxidant properties, wherein rosemary detoxifies the cardiovascular and hepatic systems and increases bile productions which favors optimal digestion of fats, in addition to its preservative characteristics.

Figure 3:
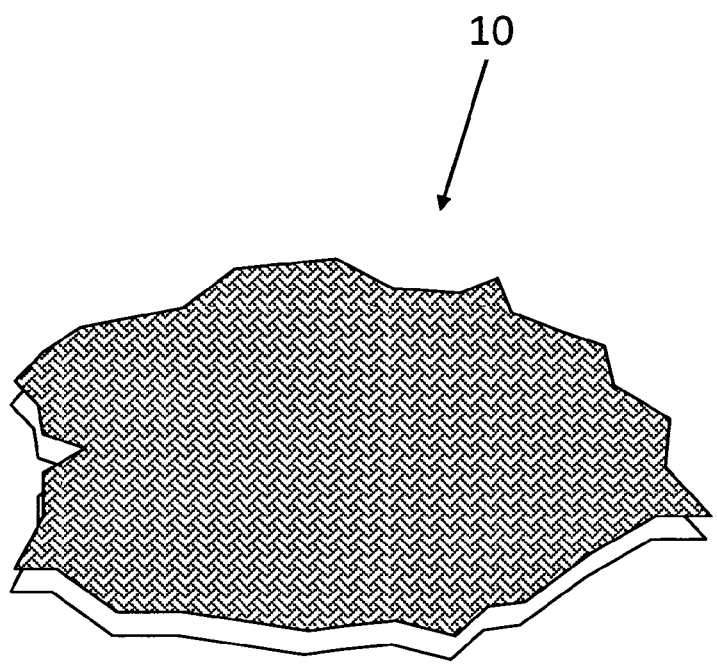
FIG. 3 is a perspective view of a consumable type pet treat having an edible packaging according to a first alternate embodiment of the present invention.
Figure 4:
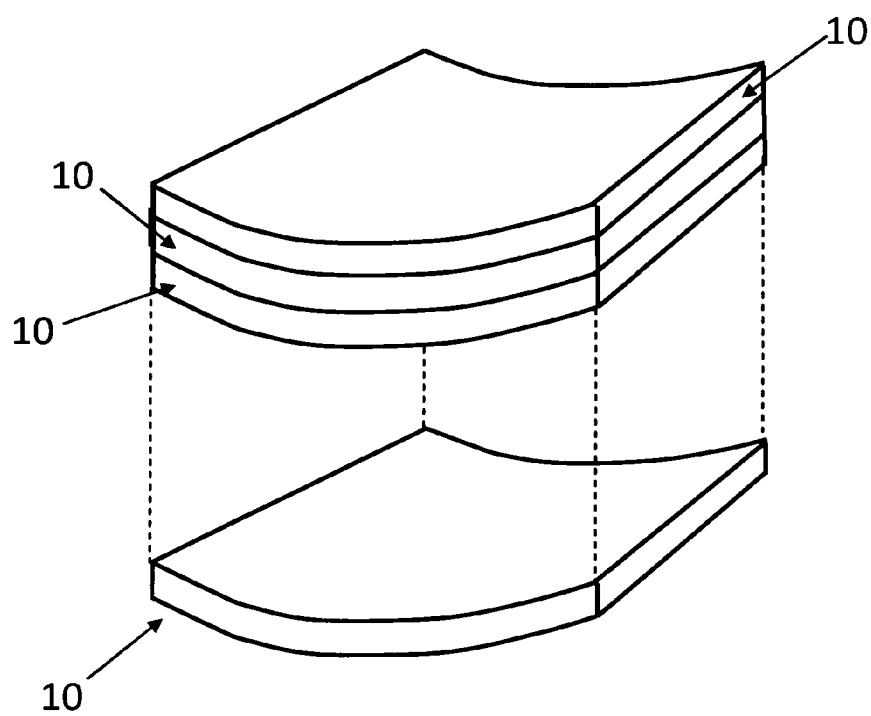
FIG. 4 is a perspective view of an alternate configuration of the embodiment of FIG. 3, in which the consumable type pet treat having an edible packaging is formed in a regular shape adapted for stacking or nesting.

As illustrated in conjunction with FIG. 3, an alternate embodiment of the treat 10 can be manufactured in a manner which a compressed or layered "chip-like" member is formed without encapsulating a central core. Anticipated as formed in a manner generally similar to that of the upper and lower sheets 12, 14 in the preferred embodiment, it is felt that a relatively thicker planar member encasing, incorporating or integrating any or all of the olfactory, gustative, nutritional or preservative components listed above, but formed in a light, entirely edible, small and inexpensive form factor. As shown in FIG. 3, a randomly contorted configuration is shown, anticipated as having the consistency and physical configuration similar to a potato chip. However, as shown in FIG. 4, this embodiment can be molded, shaped or compressed into a regular shape to facilitate stacking or nesting together, thereby allowing for a more efficient volume configuration for packaging or distribution purposes.

Figure 2:
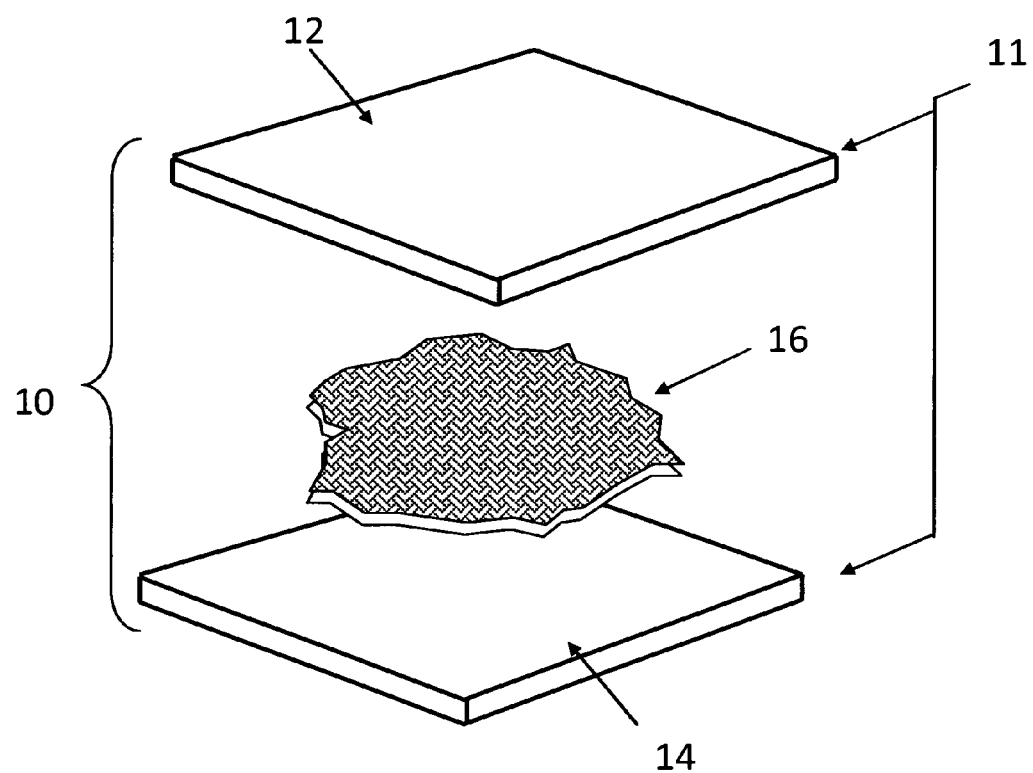
FIG. 2 is an exploded perspective view thereof.
Figure 5:
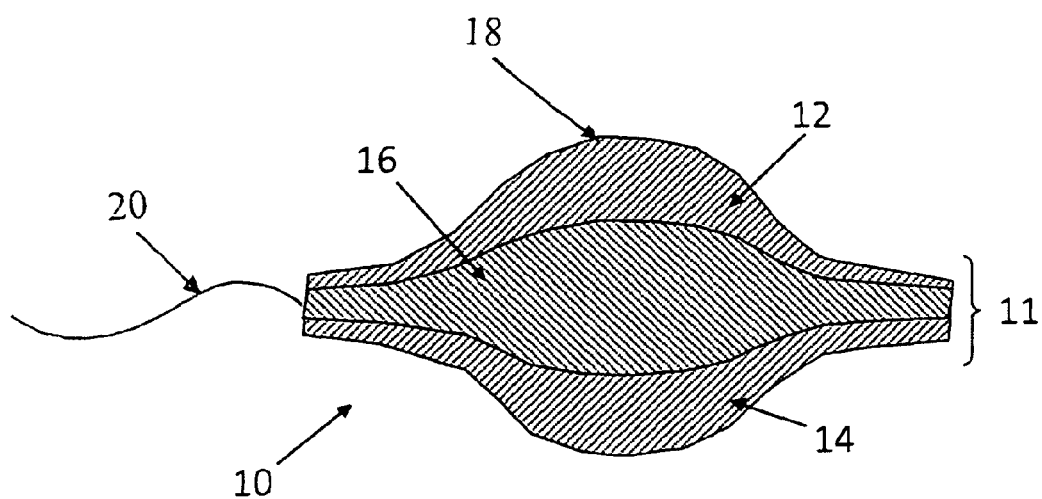
FIG. 5 is a cross sectional view taken along line V-V of FIG. 1.
Figures 6, 7, 8:
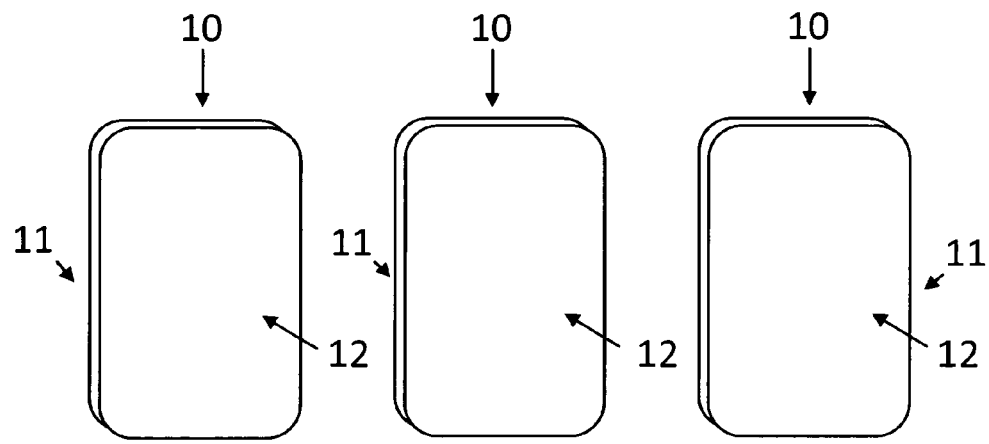
FIG. 6 is a perspective view of a consumable type pet treat having an edible packaging according to a second alternate embodiment of the present invention.
FIG. 7 is a perspective view of a consumable type pet treat having an edible packaging according to a third alternate embodiment of the present invention.
FIG. 8 is a perspective view of a consumable type pet treat having an edible packaging according to a fourth alternate embodiment of the present invention.
Figures 9, 10:
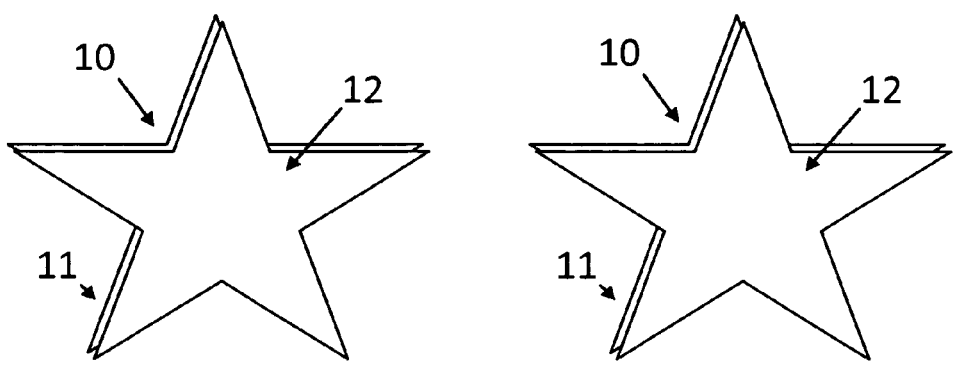
FIG. 9 is a perspective view of a consumable type pet treat having an edible packaging according to a fifth alternate embodiment of the present invention.
FIG. 10 is a perspective view of a consumable type pet treat having an edible packaging according to a sixth alternate embodiment of the present invention.

A cross sectional view taken along line V-V of FIG. 1, as shown in FIG. 5, displays the pet treat 10, the upper sheet 12, the lower sheet 14, and the central core 16.

As illustrated in FIGS. 6-10, a perspective view of a consumable type pet treat 10 having an edible packaging according to several alternate embodiment of the present invention is shown. In these embodiments the present invention is made with a paper that can be formulated with various ingredients (e.g. catnip powder or oil, salmon or tuna powder/flakes or oil, beef, chicken or bacon flakes or oil) to impart a unique, attractive taste or aroma depending on the pet species.

It is further anticipated that a binding material, either layered or intermixed, can be incorporated to include any material that is not detrimental to the health of the pet, yet provide sufficient consistency to retain form yet slowly release the material once contacted by the pet. This allows the treat 10 to be used repeatedly over a period of time or otherwise slowly consumed by the pet. Thus, the composition of the chip, binding materials, and components can be selected according to consistency and/or rigidity to extend the use of the toy (i.e., time release of the toy materials), such that wearing down or exposure of the desired materials by the pet is controlled.

The foregoing descriptions of the specific embodiments are presented for purposes of illustration and description. They are not intended to be exhaustive nor to limit the invention to the precise forms disclosed and, obviously, many modifications and variations are possible in light of the above teaching. The embodiments are chosen and described in order to best explain principles of the invention and its practical application, and to thereby enable others skilled in the art to best utilize the invention and its various embodiments with various modifications as are suited to the particular use contemplated. It is intended that a scope of the invention be broadly defined by the Specification and Drawings appended hereto and to their equivalents; hence, the scope of the invention is to be limited only by the following claims.

What is claimed is:

1. An edible treat for an animal, comprising in combination:
    an upper and lower flexible sheet formed of an edible paper product and shaped to facilitate oral interaction with the animal, wherein at least one of said upper and lower flexible sheet is formed of a food paper including a material selected from the group consisting of: rice flour; tapioca flour; corn; and grains; and
    an edible material included with the upper and lower flexible sheet that is accessible by the animal over an extended period of time, said edible material includes a substance that facilitates stimulation of a cat to interact therewith selected from the group consisting of: poultry by-products; fish meal; and fish oil;
    wherein said edible material further includes catnip.

2. The treat of claim 1, wherein said upper and lower flexible sheet surrounds multiple layers of a plurality of different edible materials.

3. The treat of claim 1, wherein said upper and lower flexible sheet includes at least one of an edible nodule and an edible string affixed thereto.

4. The treat of claim 1, wherein said upper and lower flexible sheet is compressed to a compression parameter for a particular animal such that a lower compression parameter facilitates easier access to said edible material and a higher compression parameter facilitates more difficult access to said edible material.

5. The treat of claim 1, wherein said edible material comprises at least one of an inducement, a nutrient, and a treatment.

6. The edible treat of claim 1, further comprising a food enhancement for providing an olfactory or gustative attractive material provided in a liquid or flake form.

7. The edible treat of claim 1, wherein said edible paper product is formed of a food paper or rice paper of a type capable of being made from white rice flour, tapioca flour, salt, and water.

8. The edible treat of claim 1, wherein said edible paper product is formed of a planar sheet of edible material made from ground yellow corn.

9. The edible treat of claim 1, wherein said treat is compressed or shaped so as to facilitate stacking or nesting, thereby allowing for a more efficient volume configuration for packaging or distribution purposes.

\* \* \* \* \*